United States Patent
Nishi et al.

(10) Patent No.: US 10,315,593 B2
(45) Date of Patent: Jun. 11, 2019

(54) PROTECTIVE CASE FOR ELECTRIC WIRES

(71) Applicants: YAZAKI CORPORATION, Tokyo (JP); HONDA MOTOR CO., LTD., Tokyo (JP)

(72) Inventors: Hiroyuki Nishi, Tochigi (JP); Daisuke Ohkawa, Saitama (JP)

(73) Assignees: YAZAKI CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/992,041

(22) Filed: May 29, 2018

(65) Prior Publication Data

US 2018/0345884 A1   Dec. 6, 2018

(30) Foreign Application Priority Data

May 30, 2017   (JP) .................................. 2017-107140

(51) Int. Cl.
   *H02G 3/04*      (2006.01)
   *B60R 16/02*     (2006.01)
   *H02G 11/00*     (2006.01)
   *B60N 2/02*      (2006.01)
   *B60R 16/027*    (2006.01)

(52) U.S. Cl.
   CPC ........ *B60R 16/0215* (2013.01); *B60N 2/0244* (2013.01); *B60R 16/027* (2013.01); *H02G 11/00* (2013.01); *B60N 2002/0264* (2013.01)

(58) Field of Classification Search
   CPC .......... H02G 3/08; H02G 3/081; H02G 11/00; H02G 3/04; H02G 3/0468; B60R 16/0215; B60R 16/00; B60R 16/0207; B60N 2/0244; B60N 2002/0264
   USPC ..... 174/68.1, 68.3, 72 A, 72 C, 97, 50, 135; 248/49, 68.1
   See application file for complete search history.

(56) References Cited

U.S. PATENT DOCUMENTS

| | | | |
|---|---|---|---|
| 6,570,093 B2 * | 5/2003 | Doshita | B60R 16/0215 174/135 |
| 6,903,274 B2 * | 6/2005 | Aoki | B60R 16/0215 174/68.3 |
| 6,997,499 B2 * | 2/2006 | Tsubaki | B60N 2/0224 174/72 A |

(Continued)

FOREIGN PATENT DOCUMENTS

JP    5179943 B2    4/2013

*Primary Examiner* — Angel R Estrada
(74) *Attorney, Agent, or Firm* — Kenealy Vaidya LLP

(57) ABSTRACT

A protective case includes a case body allowing a corrugated tube with an inserted electric wire to be housed in its inside, and a slider configured to move together with one end portion of the corrugated tube and to allow its movement along the case body. The slider retains the electric wire withdrawn from the one end portion to extend from inside to outside through one opening portion of the case body. The case body has a cavity portion allowing the corrugated tube to change its form inside the case body in accordance with the movement of the slider, a guide passage guiding the electric wire withdrawn from the other end portion of the corrugated tube toward another opening portion of the case body, and a corrugated tube retention portion including a pair of wall surfaces to retain the other end portion of the corrugated tube.

3 Claims, 10 Drawing Sheets

(56) References Cited

U.S. PATENT DOCUMENTS

| | | | | |
|---|---|---|---|---|
| 7,053,306 | B2 * | 5/2006 | Tsubaki | B60R 16/0215 174/72 A |
| 7,220,129 | B1 * | 5/2007 | Nishijima | B60R 16/0215 174/72 A |
| 7,238,029 | B2 * | 7/2007 | Tsubaki | B60R 16/0215 174/72 A |
| 7,814,637 | B2 * | 10/2010 | Terada | B60N 2/0224 174/113 R |
| 7,829,789 | B2 * | 11/2010 | Yamaguchi | B60R 16/0215 174/68.1 |
| 8,686,286 | B2 * | 4/2014 | Sekino | B60R 16/0215 174/50 |
| 8,841,551 | B2 * | 9/2014 | Sekino | B60N 2/0715 174/68.3 |
| 9,024,190 | B2 * | 5/2015 | Terada | B60R 16/0215 174/72 A |
| 2011/0048761 | A1 | 3/2011 | Terada et al. | |

* cited by examiner

PROTECTIVE CASE FOR ELECTRIC WIRES

CROSS-REFERENCES TO RELATED APPLICATION(S)

This application is based on and claims priority from Japanese Patent Application No. 2017-107140 filed on May 30, 2017, and the entire contents of which are incorporated herein by reference.

BACKGROUND

The present invention relates to a protective case for electric wires.

From the viewpoint of connecting a wire harness (in particular, electric wires belonging to the wire harness) to electric equipment provided on a structure movable within a predetermined range, such as a sliding seat for a vehicle, various structures for connection between the sliding seat and the wire harness have been used in the background art.

In particular, one of the background-art connection structures has an electric wire routing case for relaying electric wires extended from a wire harness routed on a vehicle body floor (underfloor) of a vehicle to electric wires connected to electric equipment built in a sliding seat. The electric wire routing case internally houses a corrugated tube passed through by electric wires, so that the electric wires extending from the opposite ends of the corrugated tube can be extracted to the outside. One-side ends of the electric wires extracted to the outside are attached to a slider so as to move together with the slider in accordance with movement of the sliding seat.

As for details of the above grommet, refer to JP 5179943 B.

SUMMARY

The aforementioned background-art electric wire routing case includes a housing with a groove portion, and a cover covering the housing, in order to house the corrugated tube internally. To house the corrugated tube into the electric wire routing case, the corrugated tube bent into a shape corresponding to the groove portion is pushed into the groove portion, and the cover is then attached to the housing so that the groove portion can be covered with the cover.

However, depending on the material, shape, etc. of the corrugated tube to be used, the shape of the corrugated tube placed in the groove portion may be elastically recovered to cause an unintentional displacement (hereinafter simply referred to as "displacement") in which the corrugated tube may, for example, come off from the groove portion. Such displacement of the corrugated tube may cause deterioration in workability on housing the corrugated tube into the electric wire routing case.

An object of the invention is to provide a protective case for electric wires which can house a corrugated tube passed through by electric wires and which is excellent in workability on housing the corrugated tube into the protective case.

Embodiments of the present invention relating to the protective case provide the following items (1) to (3).

(1)

A protective case for electric wires, the protective case comprising:

a case body allowing a corrugated tube with an inserted electric wire to be housed in its inside; and a slider configured to move together with one end portion of the corrugated tube and to allow its movement along the case body, the slider retaining the electric wire withdrawn from the one end portion to extend from inside to outside through one opening portion of the case body, the case body having: a cavity portion allowing the corrugated tube to change a form of the corrugated tube inside the case body in accordance with the movement of the slider; a guide passage guiding the electric wire withdrawn from the other end portion of the corrugated tube toward another opening portion of the case body; and a corrugated tube retention portion including a pair of wall surfaces to retain the other end portion of the corrugated tube between the cavity portion and the guide passage.

(2)

The protective case according to the item (1), wherein the case body has an opening area of the guide passage, at a place where the guide passage and the corrugated tube retention portion are connected, to eliminate the other end portion of the corrugated tube to pass through the place.

(3)

The protective case according to the item (2), wherein the case body is configured to locate an opening position of the guide passage, at the place where the guide passage and the corrugated tube retention portion are connected, to offset from an opening position of the other end portion of the corrugated tube retained by the corrugated tube retention portion.

According to first aspect of the invention, relating to the item (1), the corrugated tube retention portion for retaining an end portion of a corrugated tube is provided between the cavity portion in which the corrugated tube is disposed and the guide passage to which electric wires extended from the corrugated tube are guided. Accordingly, when the corrugated tube is housed into the case body, the displacement of the corrugated tube caused by elastic recovery of the corrugated tube or the like can be suppressed if the end portion of the corrugated tube is retained by the corrugated tube retention portion. Further, the corrugated tube retention portion has a configuration in which the end portion of the corrugated tube is put between a pair of wall surfaces. Accordingly, the work of retaining the end portion of the corrugated tube becomes easier than in such a case that the end portion is retained by the case body so as to be perfectly covered therewith.

Accordingly, the protective case according to the configuration can house the corrugated tube passed through by the electric wires and is excellent in workability on housing the corrugated tube into the protective case.

Further, the protective case according to the configuration has another advantage. In particular, it is preferable that an end portion of the corrugated tube is fixed to the case body so that an excessive external force can be prevented from acting on the electric wires extended from the corrugated tube when the form of the corrugated tube changes in accordance with the movement of the slider. According to the configuration, the end portion of the corrugated tube is retained by the corrugated tube retention portion so that the end portion of the corrugated tube can be fixed without using another fixture or the like. Even when another fixture or the like is used, the size, structure, etc. of the fixture can be simplified because the end portion of the corrugated tube is retained by the corrugated tube retention portion. Accordingly, since the fixture or the like can be omitted or can be simplified, the protective case according to the configuration can be made smaller in size than in a case where the aforementioned configuration is not provided.

According to second aspect of the invention, relating to the item (2), the opening area of the guide passage is so small that the end portion of the corrugated tube cannot pass through the guide passage. Accordingly, there is no fear that the end portion of the corrugated tube may enter the guide passage even if an external force acts on the corrugated tube to make the end portion of the corrugated tube approach the guide passage when the corrugated tube is housed into the protective case or when the slider is moved after the corrugated tube is housed. Accordingly, the displacement of the corrugated tube can be more surely suppressed.

According to third aspect of the invention, relating to the item (3), the opening position of the guide passage is offset from the opening position of the end portion of the corrugated tube. Accordingly, even if an external force acts on the corrugated tube as described above, the end portion of the corrugated tube cannot easily approach the opening position of the guide passage. Thus, the displacement of the corrugated tube can be more surely suppressed.

As described above, according to the invention, it is possible to provide a protective case for electric wires which can house a corrugated tube passed through by electric wires and which is excellent in workability on housing the corrugated tube into the protective case.

Several aspects of the invention have been described briefly above. The further details of the invention will be made clearer if the following description is read through with reference to the accompanying drawings.

DETAILED DESCRIPTION

<Embodiment>

A protective case for electric wires according to an embodiment of the invention, and a sliding seat using the protective case will be described below with reference to the drawings.

Figure 1:
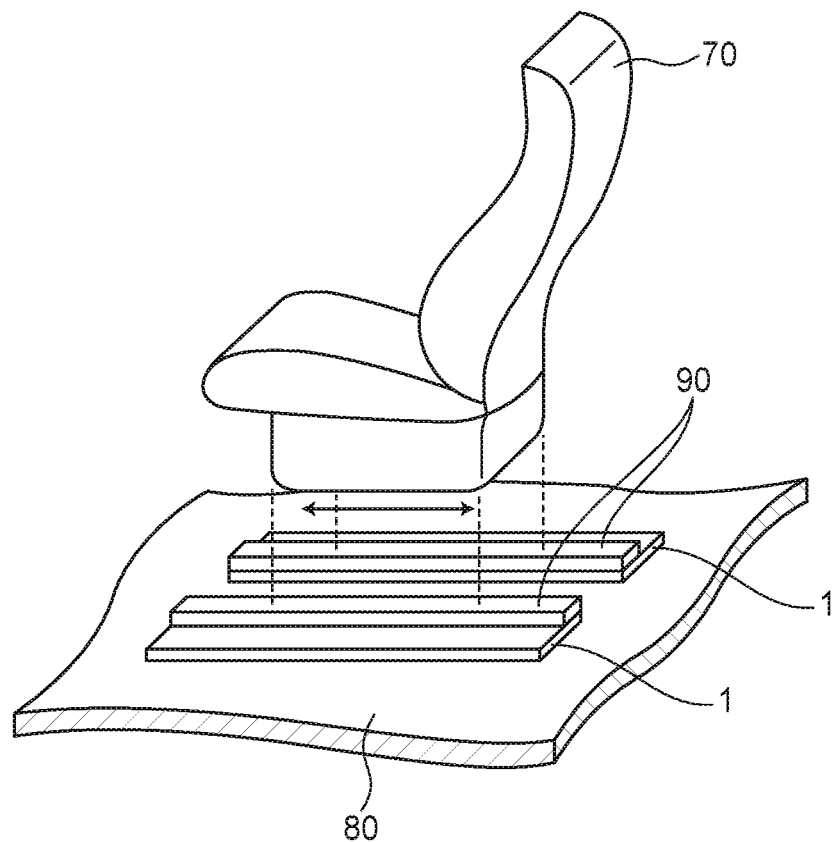
FIG. 1 is a view for explaining a mounting structure with which a sliding seat using a protective case for electric wires according to an embodiment of the invention is mounted on a floor panel of a vehicle.

As shown in FIG. 1, a protective case 1 for electric wires according to the embodiment of the invention is used in accordance with a sliding seat 70. The sliding seat 70 includes a plurality of kinds of electric equipment (not shown) such as an electric motor for adjusting the position of the seat as a whole in a front/rear direction, an electric motor for adjusting the angle of a backrest portion of the seat, etc. The sliding seat 70 is mounted on a pair of seat rails 90 movably in a front/rear direction of a vehicle. The seat rails 90 are fixed to an upper surface (vehicle interior side surface) of a floor panel 80 of the vehicle so as to extend in the front/rear direction of the vehicle.

The protective case 1 has a long shape, and is fixed to the floor panel 80 so as to extend near the pair of seat rails 90 and in the vehicle front/rear direction in accordance with the seat rails 90. The protective case 1 has a function of protecting a wire harness 60 (see FIG. 3 and so on) and a function of fixing the wire harness 60. Due to the wire harness 60, electric wires (not shown, hereinafter referred to as "floor-side electric wires) extended from a wire harness routed on the floor panel 80 can be electrically connected (relayed) with electric wires (not shown, hereinafter referred to as "seat-side electric wires) connected to electric equipment built in the sliding seat 70.

Figure 3:
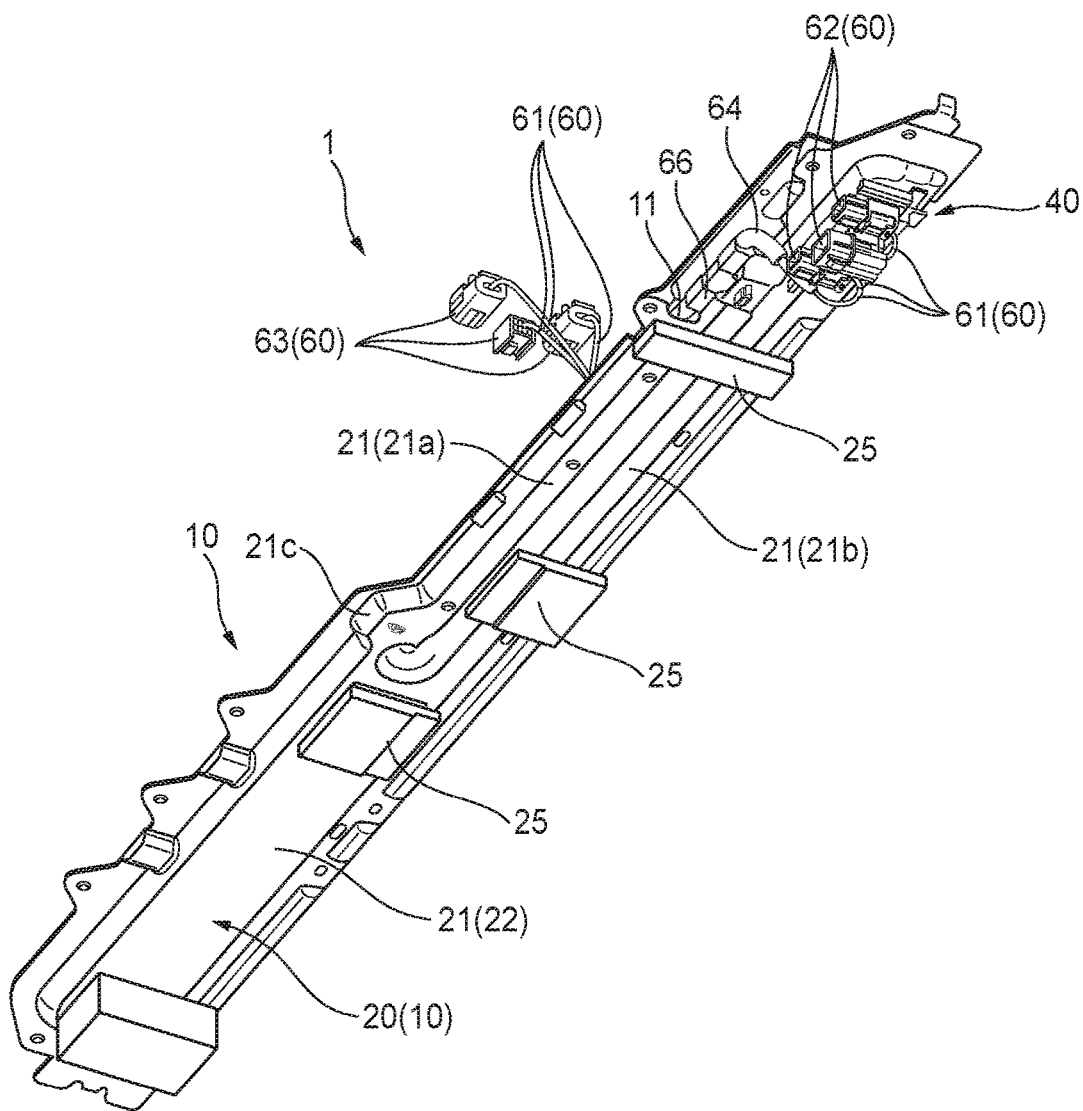
FIG. 3 is a perspective view in which the protective case is viewed from below.
Figure 4A:
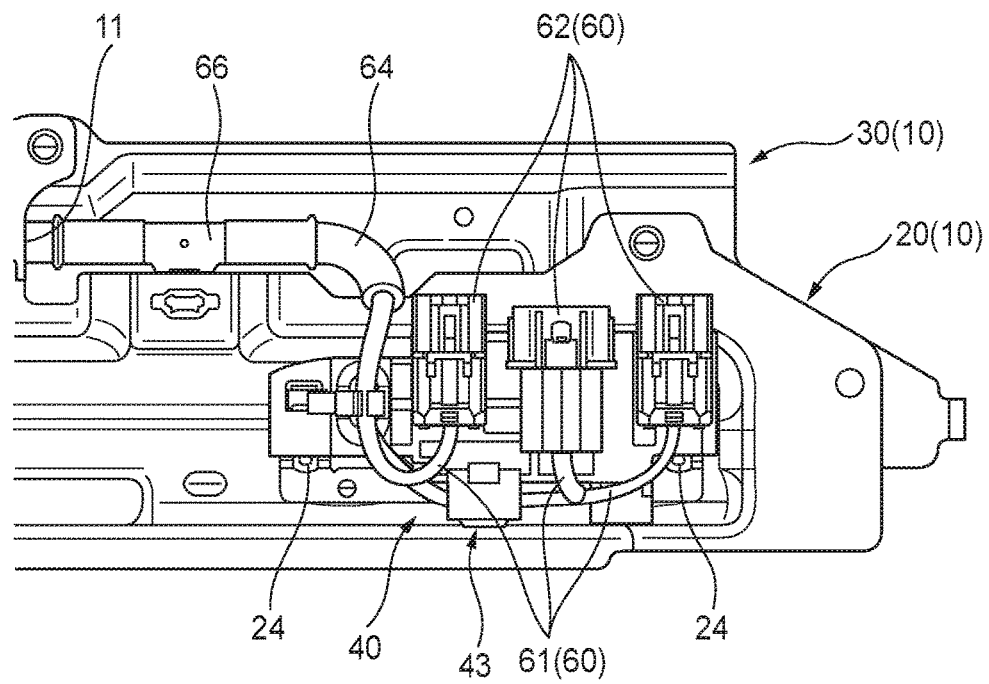
FIG. 4A is a bottom view of the protective view in which the vicinity of a bracket is enlarged.
Figure 4B:
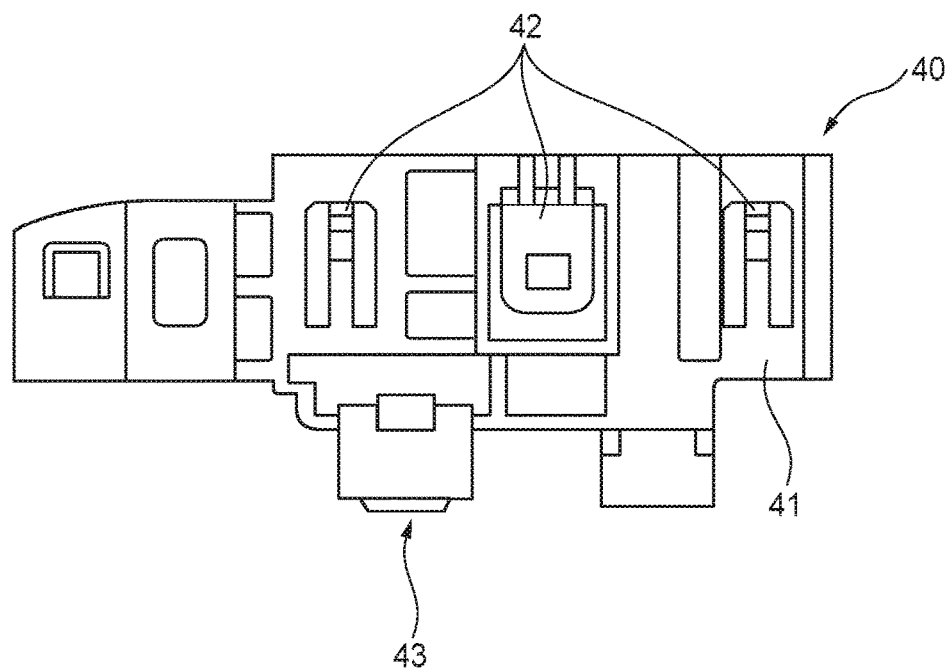
FIG. 4B is a bottom view of the bracket.

As shown in FIG. 3 and so on, the wire harness 60 has a plurality of electric wires 61, a plurality of floor-side connectors 62 attached to one-side ends of the electric wires 61 respectively, and a plurality of seat-side connectors 63 attached to the other-side ends of the electric wires 61 respectively. The floor-side connectors 62 are connected to connectors (not shown) provided in end portions of the floor-side electric wires. The seat-side connectors 63 are connected to connectors (not shown) provided in end portions of the seat-side electric wires.

Figure 2:
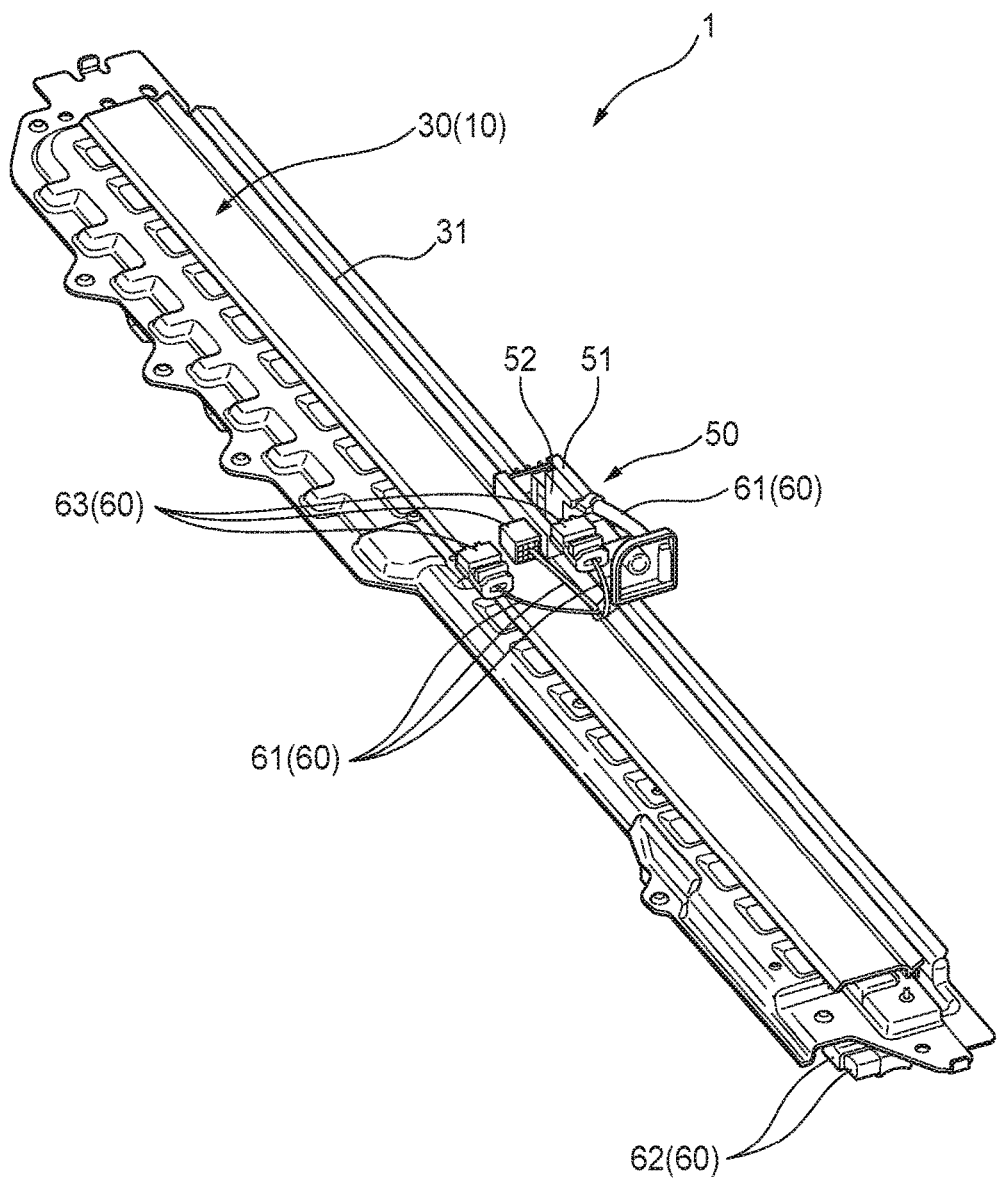
FIG. 2 is a perspective view in which the protective case is viewed from above.
Figure 2:
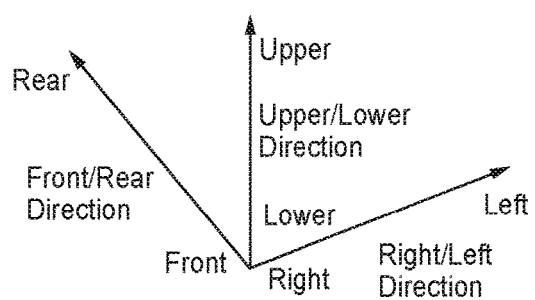

The protective case 1 will be described below. For convenience of explanation in the following description, a "front/rear direction", a "right/left direction", an "upper/lower direction", "front", "rear", "left", "right", "upper" and "lower" are defined as shown in FIG. 2. The "front/rear direction", the "right/left direction" and the "upper/lower direction" are perpendicular to one another.

The protective case 1 includes a case body 10 which can internally house the electric wires 61, a bracket 40 (see FIG. 3 and so on) which is fixed to the case body 10, and a slider 50 (see FIG. 2 and so on) which is supported on the case body 10 movably relatively thereto in the front/rear direction. As will be described later, the bracket 40 has a function of fixing the floor-side connectors 62 to the case body 10, and the slider 50 has a function of retaining the electric wires 61 near the seat-side connectors 63 movably relatively to the case body 10 in the front/rear direction.

First, the case body 10 will be described. The case body 10 includes a lower case 20 having a long shape and located on the lower side, and an upper case 30 having a long shape and located on the upper side (see FIGS. 2, 3 and 7A to 7C, etc.). The lower case 20 mainly has a function of housing the electric wires 61 so as to form the electric wires 61 into a predetermined shape in which the electric wires 61 should be routed. The upper case 30 mainly has a function of covering the electric wires 61 housed in the lower case 20 so as to prevent the electric wires 61 from being exposed to the outside.

In a state where a mating surface of an upper outer edge portion of the lower case 20 and a mating surface of a lower outer edge portion of the upper case 30 have been brought into contact with each other, the outer edge portions of the lower case 20 and the upper case 30 are fastened and fixed to each other by a predetermined fastening member (bolt or the like). Thus, the case body 10 is completed.

Figures 7A, 7B, 7C:
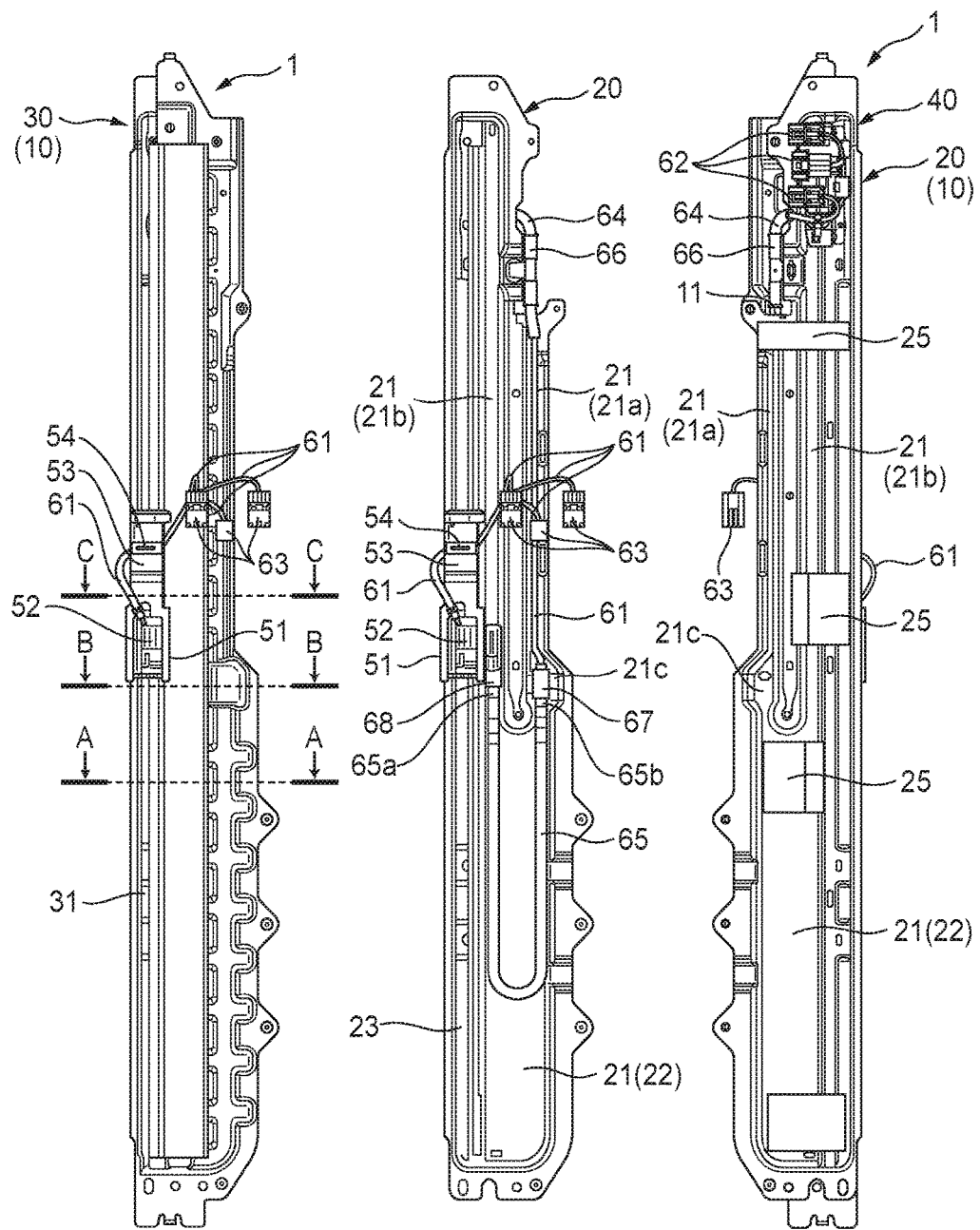
FIG. 7A is a top view of the protective case.
FIG. 7B is a top view of the protective case in which an upper case has been removed.
FIG. 7C is a bottom view of the protective case.

As shown in FIG. 3 and FIGS. 7B and 7C, an electric wire housing portion 21 for housing (receiving) the electric wires 61 is provided in the lower case 20. As can be understood from FIG. 3, the electric wire housing portion 21 is formed as a U-shaped concave portion which is recessed downward, opened frontward and extended in the front/rear direction. Accordingly, following the electric wire housing portion 21 inside the case body 10, the electric wires 61 are routed in a U-shape opened frontward and extending in the front/rear direction (FIG. 7B).

Right front end parts (a right straight part of the U-shape) of the electric wires 61 routed in the U-shape inside the case body 10 are extended from the inside of the case body 10 to the outside through an opening portion 11 (the other opening portion, see FIG. 3 and FIG. 7C) formed in the case body 10, and connected to the floor-side connectors 62. Left front end parts (a left straight part of the U-shape) of the electric wires 61 routed in the U-shape inside the case body 10 are extended from the inside of the case body 10 to the outside through a slider body 51 of the slider 50 and a slit 31 (one opening portion) of the upper case 30, and connected to the seat-side connectors 63.

A corrugated tube 64 is provided in, of the electric wires 61 extended from the opening portion 11 to the outside of the case body 10, parts in the vicinity of the opening portion 11, so that the outer circumference of the parts can be covered with the corrugated tube 64. Of the electric wires 61, the parts where the corrugated tube 64 is provided are fixed to the lower case 20 by a fixture 66 (see FIG. 3, FIGS. 4A, 4B and FIG. 7C).

Figure 10A:
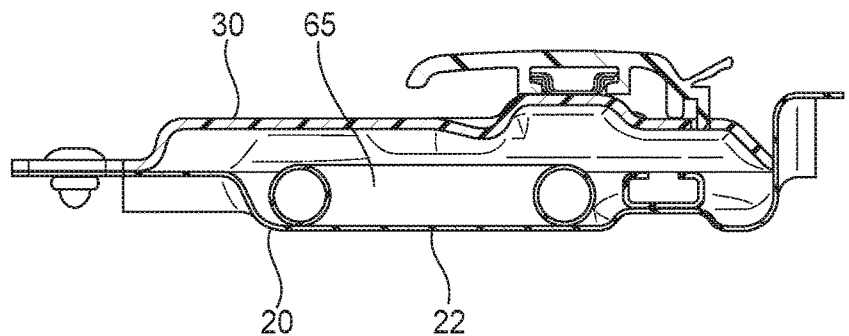
FIG. 10A, FIG. 10B and FIG. 10C are sectional views taken on line A-A, line B-B and line C-C in FIG. 7A respectively.
Figure 10B:
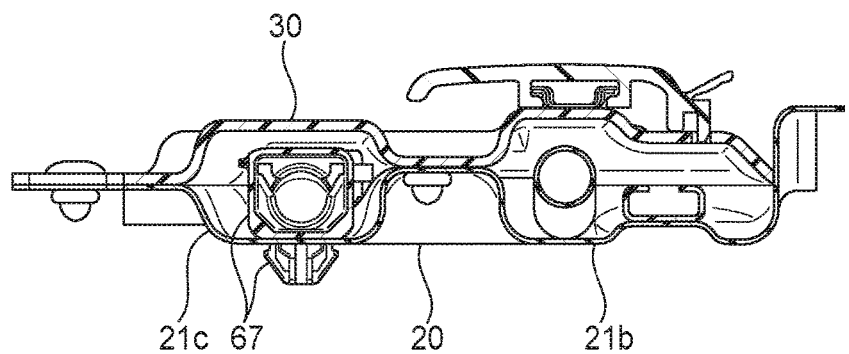
Figure 10C:
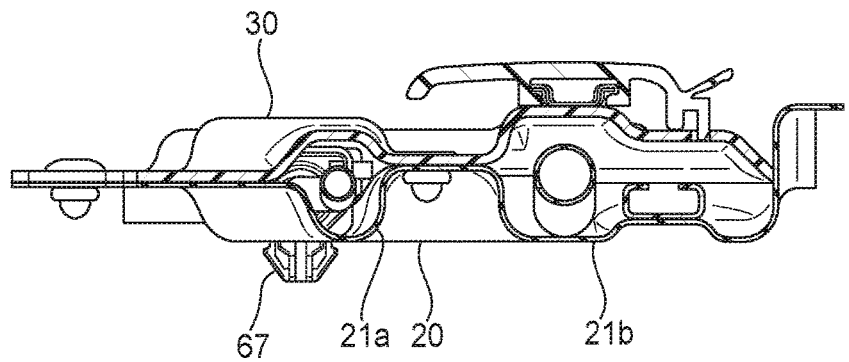

A corrugated tube 65 is provided in, of the electric wires 61 routed in the U-shape inside the case body 10, parts (a bent part of the U-shape) whose form can vary in accordance with movement of the slider 50 in the front/rear direction. A left end portion 65a of the corrugated tube 65 is fixed to the slider body 51 through a fixture 68 (see FIG. 7B). A right end portion 65b of the corrugated tube 65 is fixed to the lower case 20 through a fixture 67 (see FIG. 7B and FIGS. 10B and 10C).

In this manner, of the pair of straight parts of the electric wire housing portion 21 extending in the front/rear direction, the right part (the right straight concave portion of the U-shape) serves as a guide passage 21a by which the electric wires 61 extended from the end portion 65b of the corrugated tube 65 can be guided toward the opening portion 11 of the case body 10. Of the pair of straight parts of the electric wire housing portion 21 extending in the front/rear direction, the left part (the left straight concave portion of the U-shape) serves as an allowance portion 21b which allows a positional change in the end portion 65a of the corrugated tube 65 fixed to the slider body 51 in accordance with the movement of the slider 50 in the front/rear direction.

Figures 8A, 8B:
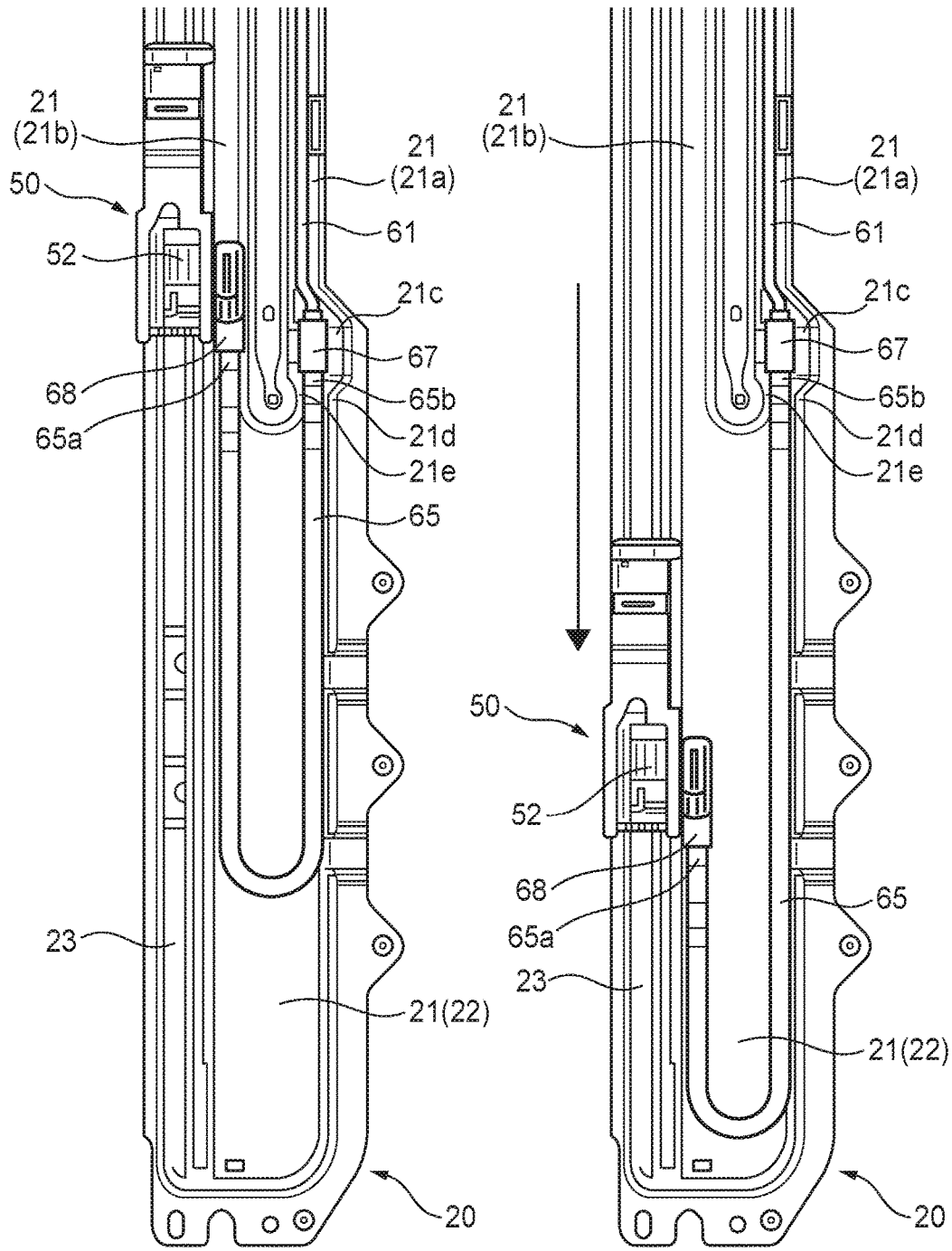
FIG. 8A and FIG. 8B are views for explaining a change in form of a wire harness inside the protective case when a slider is sliding.
Figures 9A, 9B:
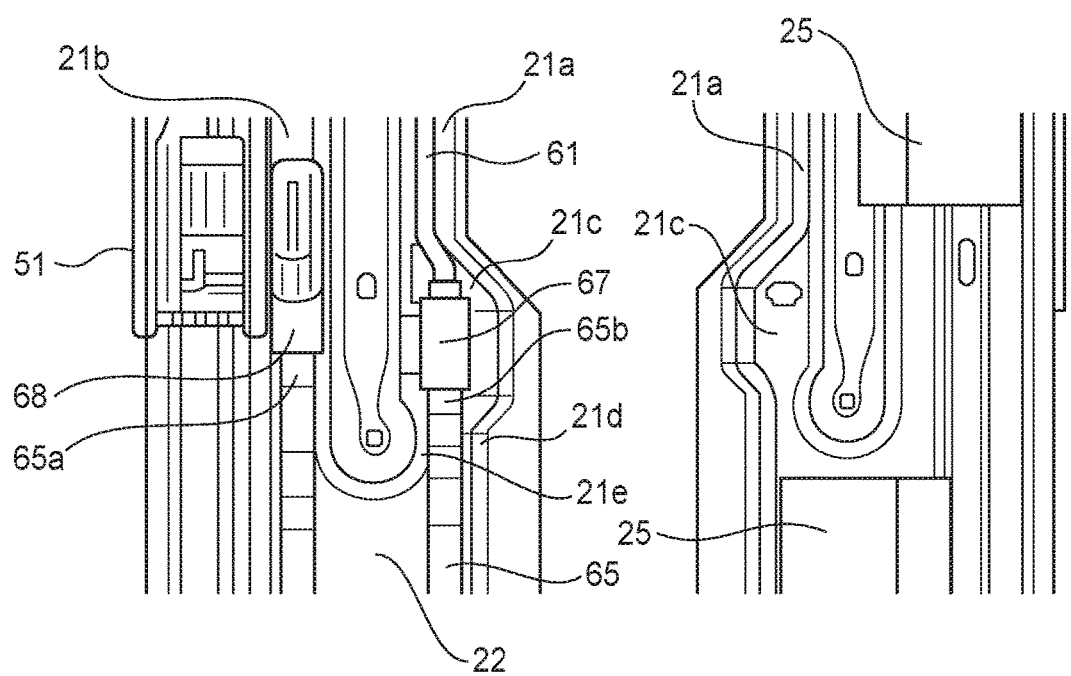
FIG. 9A is a view in which the vicinity of a corrugated tube retention portion is enlarged in FIG. 7B.
FIG. 9B is a view in which the vicinity of the corrugated tube retention portion is enlarged in FIG. 7C.

The rear end part (the concave portion housing the bent corrugated tube 65) of the electric wire housing portion 21 has a rectangular shape having a width expanded largely in the front/rear direction so as to extend in the front/rear direction. The rectangular part extending in the front/rear direction serves as a cavity portion 22 which allows a change in the form of the corrugated tube 65 inside the case body 10 in accordance with the movement of the slider 50 in the front/rear direction, as shown in FIGS. 8A and 8B. In this manner, the electric wire housing portion 21 is constituted by the rectangular cavity portion 22 extending in the front/rear direction, and the guide passage 21a and the allowance portion 21b extending frontward from the left and right opposite parts of the front end portion of the cavity portion 22 respectively.

Of the electric wire housing portion 21, the connection part between the cavity portion 22 and the guide passage 21a forms a corrugated tube retention portion 21c (see FIG. 3, FIGS. 7B and 7C, and FIGS. 9A and 9B). Particularly as shown in FIG. 9 in which the corrugated tube retention portion 21c is enlarged and illustrated, the corrugated tube retention portion 21c retains the end portion 65b of the corrugated tube 65 between a pair of wall surfaces 21d and 21e.

In this embodiment, as described above, the end portion 65b of the corrugated tube 65 is also fixed by the fixture 67. However, since the end portion 65b of the corrugated tube 65 is retained by the corrugated tube retention portion 21c, the end portion 65b of the corrugated tube 65 can be fixed without using the fixture 67.

In addition, even when the fixture 67 is used as in the embodiment, the size, structure, etc. of the fixture 67 can be simplified in comparison with a case where the corrugated tube retention portion 21c is absent. In this manner, since the end portion 65b of the corrugated tube 65 is fixed to the lower case 20, it is possible to suppress a displacement of the corrugated tube 65 caused by elastic recovery of the corrugated tube 65 or the like.

The opening area of the guide passage 21a in the connection part between the guide passage 21a and the corrugated tube retention portion 21c in the electric wire housing portion 21 is designed to be so small that the end portion 65b of the corrugated tube 65 cannot pass through the guide passage 21a. Accordingly, there is no fear that the end portion 65b of the corrugated tube 65 may enter the guide passage 21a even if an external force acts on the corrugated tube 65 to make the end portion 65b of the corrugated tube 65 approach the guide passage 21a (that is, come frontward) when the corrugated tube 65 is housed into the lower case 20 or when the slider 50 is moved after the corrugated tube 65 is housed. Accordingly, the displacement of the end portion 65b of the corrugated tube 65 can be prevented.

Further, as can be understood from FIG. 9A and FIGS. 10A to 10C, the opening position of the guide passage 21a in the connection part between the guide passage 21a and the corrugated tube retention portion 21c is offset (to the left in this embodiment) from the opening position of the end portion 65b of the corrugated tube 65 retained by the corrugated tube retention portion 21c. Accordingly, even if an external force acts on the corrugated tube 65 to make the end portion 65b of the corrugated tube 65 approach the guide passage 21a (that is, come frontward) as described above, the end portion 65b cannot easily approach the opening position 21a. Thus, the end portion 65b can be more surely prevented from entering the guide passage 21a.

As shown in FIG. 7B, a groove 23 recessed downward and extending in the front/rear direction is formed near the left edge portion of the lower case 20 extending in the front/rear direction. The groove 23 has a function of supporting the slider 50 movably in the front/rear direction (as will be described in detail later).

As shown in FIG. 2 and FIG. 7A, a slit 31 (through hole) extending in the front/rear direction all over the length of the upper case 30 in the front/rear direction is provided near the left edge portion of the upper case 30 extending in the front/rear direction. The slit 31 also has a function of supporting the slider 50 movably in the front/rear direction (as will be described in detail later), in the same manner as the groove 23.

Next, the bracket 40 will be described. As shown in FIG. 3 and FIG. 7C, the bracket 40 made of resin is provided near the front end portion of the lower surface of the lower case 20. The bracket 40 mainly has a function of fixing a plurality (three in this embodiment) of floor-side connectors 62.

As shown in FIGS. 4A, 4B, 5 and 6, a plurality (three in this embodiment) of connector retention portions 42 for fixing the floor-side connectors 62 respectively are provided in a bracket body 41 of the bracket 40. The floor-side connectors 62 are fixed to the connector retention portions 42 respectively (see FIG. 6). One of known structures may be used as a specific structure for fixing the floor-side connectors 62.

Figure 5:
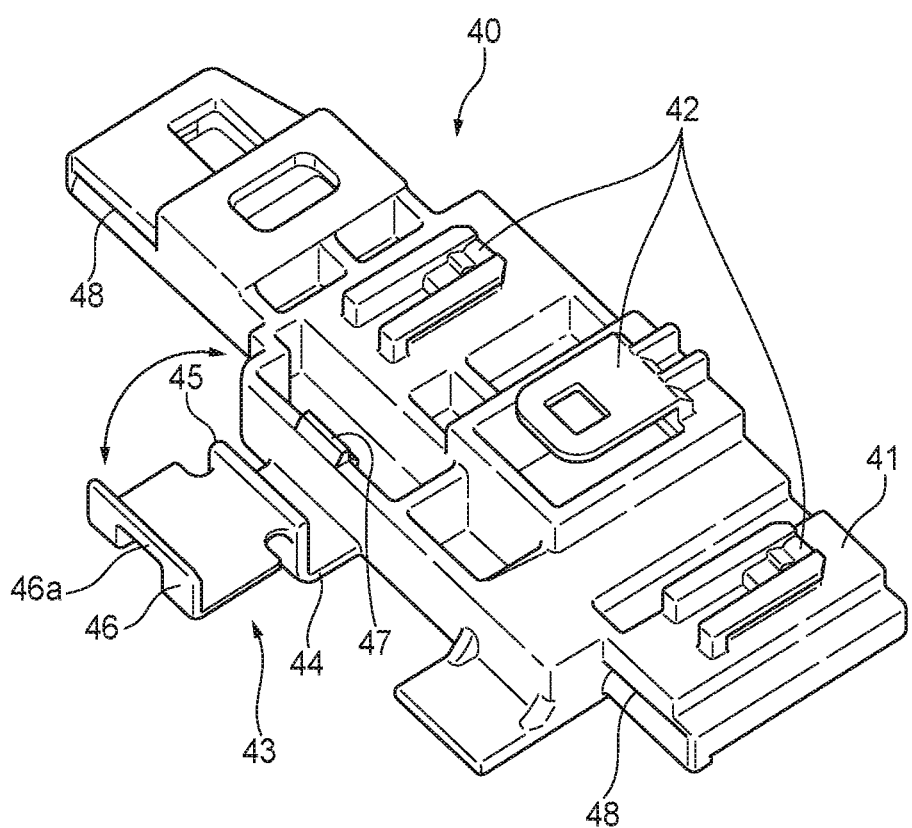
FIG. 5 is a perspective view in which the bracket is viewed from below.
Figure 6:
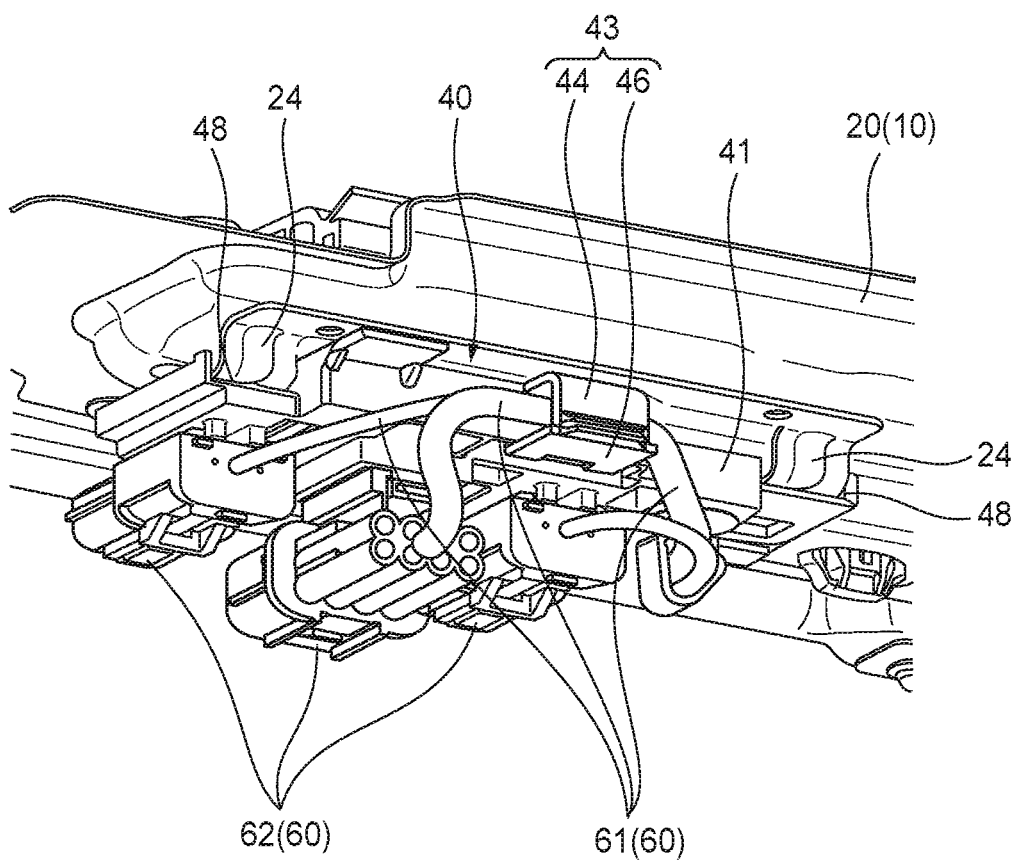
FIG. 6 is a perspective view of the protective case in which the vicinity of the bracket is enlarged.

An electric wire holding portion 43 for bundling and holding a plurality of the electric wires 61 near a plurality of the floor-side connectors 62 is provided in the bracket body 41. As shown in FIG. 5, the electric wire holding portion 43 has a stay 44 extending in an L-shape from the left side surface of the body 41, and a cover 46 provided for the stay 44 openably/closably with a hinge portion 45 as a fulcrum. The hinge portion 45 is located in a front end portion of the stay 44. When a lock hole 46a provided in the cover 46 is locked to a lock protrusion 47 on the body 41 side, the cover 46 can be retained in a closed position.

In the state where the cover 46 is in the open position, a plurality of the electric wires 61 extending from the opening portion 11 and located near the floor-side connectors 62 are bundled and inserted into an internal space of the stay 44, and the cover 46 is then kept in the closed position. Thus, the electric wires 61 can be bundled and held in a space between the cover 46 and the stay 44 (see FIG. 6). In this manner, the electric wires 61 are bundled and held between the opening portion 11 and the connector retention portion 42 by the electric wire holding portion 43. In this embodiment, of the three electric wires 61, two electric wires 61 are bundled and held by the electric wire holding portion 43.

Here, there may be a difference in excess length among the electric wires 61 between the connector retention portion 42 and the opening portion 11 where the electric wires 61 are extended from the case body 10. With respect to this point, in the protective case 1, the electric wires 61 are bundled and held by the electric wire holding portion 43 between the opening portion 11 of the case body 10 and the connector retention portion 42. Accordingly, it will go well only if a space corresponding to the dimensions of the electric wire holding portion 43 is secured as a space for absorbing the excess lengths of the electric wires 61 even when there is a difference in excess length among the electric wires 61.

In the opposite end portions of the bracket body 41 in the front/rear direction, a pair of fixing holes 48 are provided to be open to the left. A pair of arms 24 (see FIG. 6) provided near the front end portion of the lower surface of the lower case 20 and extending to the right are inserted into the pair of fixing holes 48 respectively. Thus, the bracket body 41 (and hence the bracket 40) can be fixed to the lower case 20 (and hence the case body 10).

Here, when the floor-side connectors 62 are fixed to the connector retention portion 42 of the bracket 40 and the bracket 40 is then attached to the case body 10, workability on the work of fixing the floor-side connectors 62 can be improved in comparison with a case where the floor-side connectors are attached to the case body 10 individually. In this manner, the floor-side connectors 62 are fixed to the case body 10 through the bracket 40.

Next, the slider 50 will be described. As shown in FIG. 2 and FIGS. 7A and 7B, the slider 50 is provided with a box-like slider body 51 internally having a hole portion 52 opened upward, and a stay 53 extending frontward from a front part of an upper edge portion of the slider body 51. The stay 53 is provided with a through hole 54.

A first fitting portion (not shown) which can be fitted to the groove 23 of the lower case 20 is provided in the bottom wall (lower wall) of the slider body 51. A second fitting portion (not shown) which can be fitted to the slit 31 provided in the upper case 30 is provided at a central position of the slider body 51 in the upper/lower direction. When the first and second fitting portions are fitted to the groove 23 and the slit 31, the slider body 51 (and hence the slider 50) is supported movably only in the front/rear direction relatively to the case body 10.

Of the electric wires 61 routed in the U-shape inside the case body 10, parts fixed to the slider body 51 by the fixture 68 (see FIG. 7B) enter the hole portion 52 through a through hole (not shown) provided in, of the right side wall of the slider body 51, a part located on the lower side from the upper case 30 (slit 31). The parts entering the hole portion 52 pass through the hole portion 52 (and hence the slit 31) and extend to the outside from the upper opening of the hole portion 52.

The electric wires 61 thus extending to the outside pass through the through hole 54 from the upper side to the lower side, and extend up to the seat-side connectors 63. In this manner, the electric wires 61 near the seat-side connectors 63 are retained movably in the front/rear direction relatively to the case body 10 by the slider 50.

Using stays 25 (see FIG. 3 and FIG. 7C) provided at a plurality (three in this embodiment) of places in the lower surface of the lower case 20, the protective case 1 in which the wire harness 60 has been routed thus is fixed to the floor panel 80 so as to extend along the front/rear direction of the vehicle near the seat rails 90 (see FIG. 1). Then, the floor-side connectors 62 are connected to connectors (not shown) provided in end portions of floor-side electric wires, and the seat-side connectors 63 are connected to connectors (not shown) provided in end portions of seat-side electric wires. Thus, the floor-side electric wires and the seat-side electric wires are electrically connected to each other respectively so that electric equipment built in the sliding seat 70 can achieve its functions.

In addition, when the sliding seat 70 moves in the front/rear direction relatively to the floor panel 80, the slider 50 moves freely (passively) in accordance with the movement of the sliding seat 70 (and hence the movement of the seat-side connectors 63). Thus, there is no fear that overload may be applied to connection parts between the seat-side connectors 63 and the connectors provided in the end portions of the seat-side electric wires.

According to the protective case 1 for electric wires according to the embodiment, as has been described above, the corrugated tube retention portion 21c for retaining the end portion 65b of the corrugated tube 65 is provided in the case body 10 between the cavity portion 22 where the corrugated tube 65 should be disposed and the guide portion 21a to which the electric wires 61 extended from the corrugated tube 65 should be guided. Accordingly, when the corrugated tube 65 is housed into the case body 10, a displacement of the corrugated tube 65 caused by the elastic recovery of the corrugated tube 65 or the like can be suppressed if the end portion 65b of the corrugated tube 65 is retained by the corrugated tube retention portion 21c.

Further, it is preferable that the end portion 65b of the corrugated tube 65 is fixed to the case body 10 so that an excessive external force can be prevented from acting on the electric wires 61 extended from the corrugated tube 65 when the form of the corrugated tube 65 changes in accordance with the movement of the slider 50. According to the embodiment, although the end portion 65b of the corrugated tube 65 is also fixed by the fixture 67, the end portion 65b of the corrugated tube 65 is retained by the corrugated tube retention portion 21c so that the end portion 65b of the corrugated tube 65 can be fixed without using the fixture 67. Even when the fixture 67 is used as in the embodiment, the size, structure, etc. of the fixture 67 can be simplified in comparison with a case where the corrugated tube retention portion 21c is absent. Accordingly, it is possible to contribute to miniaturization of the protective case 1.

Accordingly, the protective case 1 according to the embodiment is excellent in workability on housing the corrugated tube 65 into the protective case 1 which can house the corrugated tube 65 passed through by the electric wires 61. Further, according to the protective case 1 according to the embodiment, the size of the protective case 1 itself can be made smaller than in the background art.

Further, the opening area of the guide passage 21a is so small that the end portion 65b of the corrugated tube 65 cannot pass through the guide passage 21a. Accordingly, there is no fear that the end portion 65b of the corrugated tube 65 may enter the guide passage 21a even if an external force acts on the corrugated tube 65 to make the end portion 65b of the corrugated tube 65 approach the guide passage 21a (that is, come frontward) when the corrugated tube 65 is housed into the protective case 1 or when the slider 50 is moved after the corrugated tube 65 is housed. Accordingly, the displacement of the end portion 65b of the corrugated tube 65 can be prevented.

Further, the opening position of the guide passage 21a is offset from the opening position of the end portion 65b of the corrugated tube 65 when the corrugated tube 65 is housed in the protective case 1. Accordingly, even if an external force acts on the corrugated tube 65 so as to make the end portion 65b of the corrugated tube 65 approach the guide passage 21a (that is, come frontward) as described above, the end portion 65b of the corrugated tube 65 can be more surely prevented from entering the guide passage 21a.

<Other Embodiments>

The present invention is not limited to any of the aforementioned embodiments, but various modifications may be made within the scope of the invention.

For example, in the aforementioned embodiment, the opening area of the guide passage 21a is so small that the end portion 65b of the corrugated tube 65 cannot pass through the guide passage 21a. However, the opening area of the guide passage 21a is large enough to allow the end portion 65b of the corrugated tube 65 to pass through the guide passage 21a.

Further, in the aforementioned embodiment, the opening position of the guide passage 21a is offset from the opening position of the end portion 65b of the corrugated tube 65 when the corrugated tube 65 is housed in the protective case 1. However, the opening position of the guide passage 21a may agree with (or not offset from) the opening position of the end portion 65b of the corrugated tube 65 when the corrugated tube 65 is housed in the protective case 1.

Here, the features of the aforementioned embodiments of the protective case for electric wires according to the invention will be summarized and listed briefly in the following items [1] to [3].

[1] A protective case (1) for electric wires, the protective case comprising:
a case body (10) allowing a corrugated tube (65) with an inserted electric wire (61) to be housed in its inside; and a slider (50) configured to move together with one end portion (65a) of the corrugated tube and to allow its movement along the case body, the slider retaining the electric wire withdrawn from the one end portion (65) to extend from inside to outside through one opening portion (31) of the case body,
the case body (10) having: a cavity portion (22) allowing the corrugated tube (65) to change a form of the corrugated tube inside the case body in accordance with the movement of the slider (50); a guide passage (21a) guiding the electric wire withdrawn from the other end portion (65b) of the corrugated tube toward another opening portion (11) of the case body; and a corrugated tube retention portion (21c) including a pair of wall surfaces (21d and 21e) to retain the other end portion (65b) of the corrugated tube between the cavity portion (22) and the guide passage (21a).

[2] The protective case according to the item [1], wherein the case body (10) has an opening area of the guide passage (21a), at a place where the guide passage (21a) and the corrugated tube retention portion (21c) are connected, to eliminate the other end portion (65b) of the corrugated tube to pass through the place.

[3] The protective case according to the item [2], wherein the case body (10) is configured to locate an opening position of the guide passage (21a), at the place where the guide passage (21a) and the corrugated tube retention portion (21c) are connected, to offset from an opening position of the other end portion (65b) of the corrugated tube retained by the corrugated tube retention portion (21c).

REFERENCE SIGNS LIST 1 protective case for electric wires
10 case body
11 opening portion (the other opening portion)
21a guide passage
21c corrugated tube retention portion
21d, 21ea pair of wall surfaces
22 cavity portion
31 slit (one opening portion)
50 slider
61 electric wire
65 corrugated tube
65a end portion (one end portion) of corrugated tube
65b end portion (the other end portion) of corrugated tube

The invention claimed is:

1. A protective case for electric wires, the protective case comprising:
a case body allowing a corrugated tube with an inserted electric wire to be housed in its inside; and
a slider configured to move together with one end portion of the corrugated tube and to allow its movement along the case body, the slider retaining the electric wire withdrawn from the one end portion to extend from inside to outside through one opening portion of the case body,
the case body having:
a cavity portion allowing the corrugated tube to change a form of the corrugated tube inside the case body in accordance with the movement of the slider;
a guide passage guiding the electric wire withdrawn from the other end portion of the corrugated tube toward another opening portion of the case body to allow the electric wire to be extended to outside the case body through the another opening portion, the other end portion of the corrugated tube being located inside the case body; and a corrugated tube retention portion including a pair of wall surfaces, the corrugated tube retention portion is configured to retain the other end portion of the corrugated tube between the cavity portion and the guide passage.

2. The protective case according to claim 1, wherein the case body has an opening area of the guide passage, at a place where the guide passage and the corrugated tube retention portion are connected, to eliminate the other end portion of the corrugated tube to pass through the place.

3. A protective case for electric wires, the protective case comprising:
  a case body allowing a corrugated tube with an inserted electric wire to be housed in its inside; and
  a slider configured to move together with one end portion of the corrugated tube and to allow its movement along the case body, the slider retaining the electric wire withdrawn from the one end portion to extend from inside to outside through one opening portion of the case body,
  the case body having:
    a cavity portion allowing the corrugated tube to change a form of the corrugated tube inside the case body in accordance with the movement of the slider;
    a guide passage guiding the electric wire withdrawn from the other end portion of the corrugated tube toward another opening portion of the case body; and
    a corrugated tube retention portion including a pair of wall surfaces to retain the other end portion of the corrugated tube between the cavity portion and the guide passage, wherein
  the case body has an opening area of the guide passage, at a place where the guide passage and the corrugated tube retention portion are connected, to eliminate the other end portion of the corrugated tube to pass through the place, and
  the case body is configured to locate an opening position of the guide passage, at the place where the guide passage and the corrugated tube retention portion are connected, to offset from an opening position of the other end portion of the corrugated tube retained by the corrugated tube retention portion.

* * * * *